United States Patent [19]

Aralt

[11] Patent Number: 5,183,376

[45] Date of Patent: Feb. 2, 1993

[54] ARRANGEMENT FOR LOADING AND UNLOADING OF HEAVY PACKAGES

[76] Inventor: Per T. Aralt, Hopsnesvn. 75, N-5043 Hop, Norway

[21] Appl. No.: 623,451

[22] PCT Filed: Jun. 15, 1989

[86] PCT No.: PCT/NO89/00060

§ 371 Date: Dec. 5, 1990

§ 102(e) Date: Dec. 5, 1990

[87] PCT Pub. No.: WO89/12598

PCT Pub. Date: Dec. 28, 1989

[30] Foreign Application Priority Data

Jun. 16, 1988 [NO] Norway .................. 882664

[51] Int. Cl.$^5$ ................................. B66F 9/00
[52] U.S. Cl. .................... 414/592; 405/209; 414/139.4
[58] Field of Search .......... 180/8.5; 405/196, 204, 405/209; 414/139.4, 592

[56] References Cited

U.S. PATENT DOCUMENTS 4,607,982  8/1986  Brasted et al. .................. 405/204
4,826,355  5/1989  Marion .............................. 405/209

FOREIGN PATENT DOCUMENTS 150596   6/1982  Norway .
158013   3/1987  Norway .
WO823841 11/1982 PCT Int'l Appl. .
629312   9/1978  U.S.S.R. ........................ 405/196
1421598  9/1988  U.S.S.R. ........................ 180/8.5
2008652  6/1979  United Kingdom ............. 405/209

Primary Examiner—David A. Bucci
Assistant Examiner—Janice Krizek
Attorney, Agent, or Firm—Francis C. Hand

[57] ABSTRACT

An arrangement for the transportation of a heavy package of a vessel to a quay or similar loading location uses a first apparatus for transportation of the package in a vertical direction and a second apparatus for transportation in a horizontal direction. A support member in which the package is placed is alternately raised and lowered by a set of lifting devices. The support member and a support element are also supported separately and alternately on a foundation via climbing arrangements. The support member and support element are moved in a stepwise lifting movement or in a stepwise lowering movement.

6 Claims, 3 Drawing Sheets

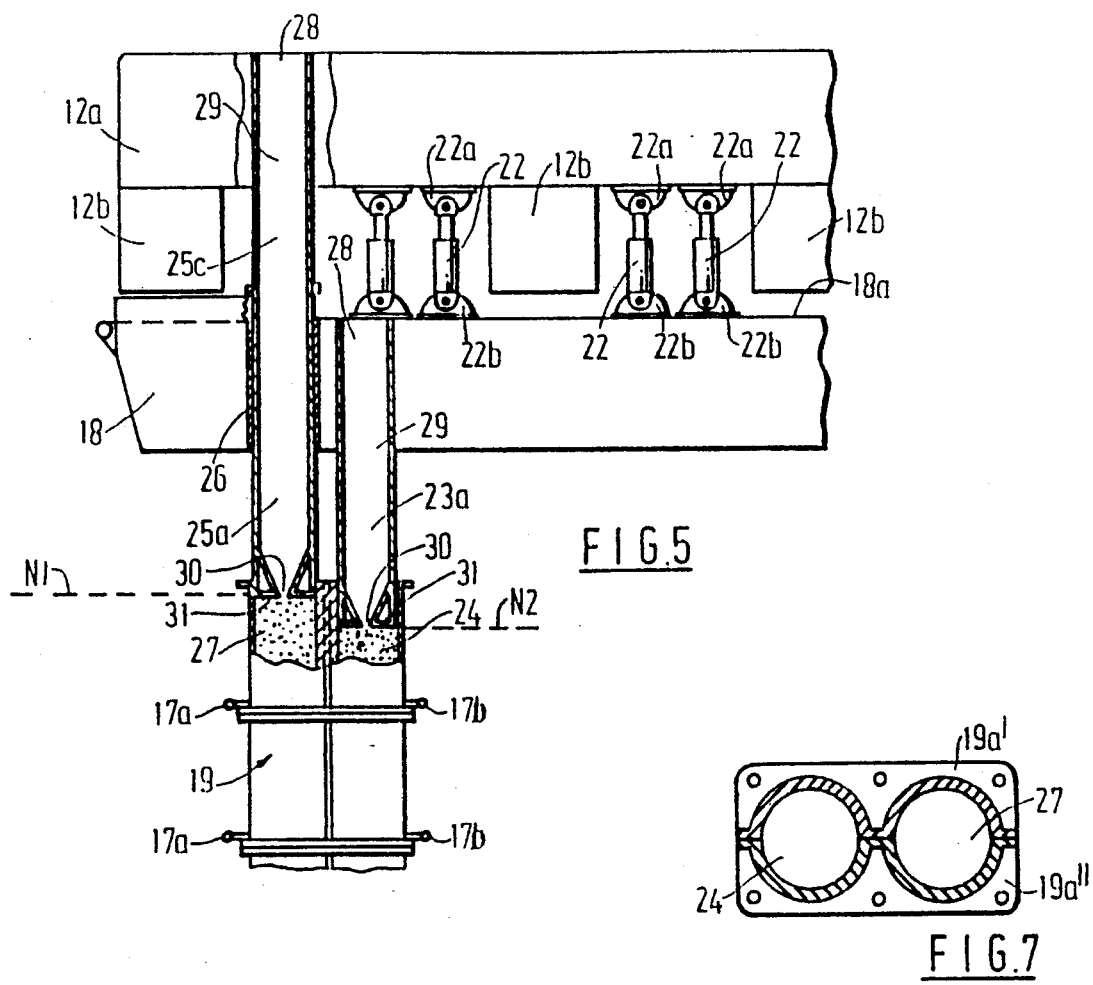
FIG.5
FIG.7
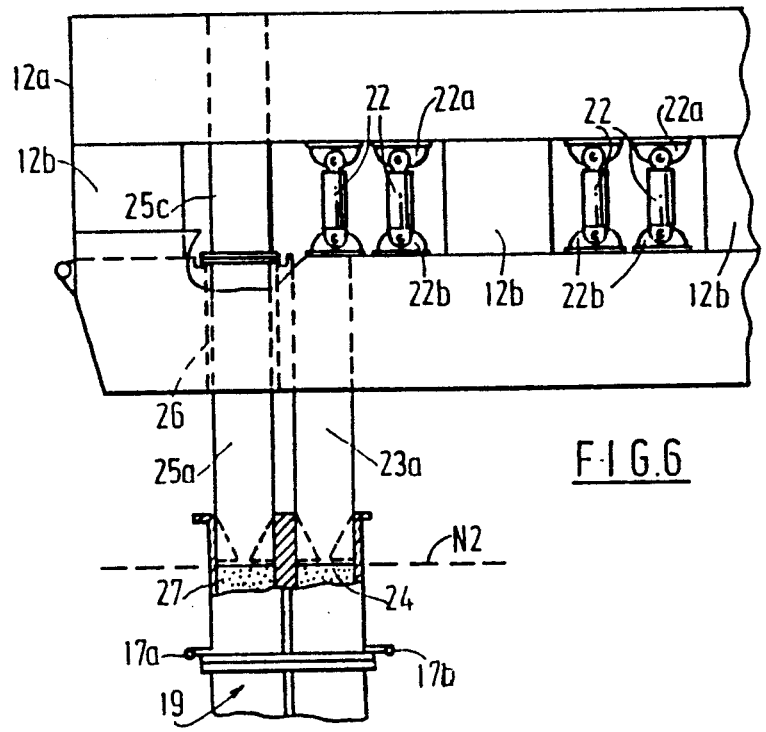
FIG.6

ARRANGEMENT FOR LOADING AND UNLOADING OF HEAVY PACKAGES

The present invention relates to a process for transportation of a heavy package from vessel to quay or similar loading and unloading location, and vice versa, where there is used a first transportation arrangement for lifting and lowering of the package in a vertical direction and a second transportation arrangement for transporting the package in a horizontal direction between a position outside the vessel and a position inside the vessel, and vice versa.

Furthermore the invention relates to an arrangement for transportation of a heavy package from vessel to quay or similar loading and unloading location, and vice versa, comprising a first transportation arrangement for lifting and lowering the package in a vertical direction and a second transportation arrangement for transportation of the package in a horizontal direction between a position outside the vessel and a position inside the vessel, and vice versa.

In many ports, and particularly at outlying loading and unloading locations with poor access to lifting and transportation equipment for handling heavy packages between vessel and quay and another loading and unloading location, large expenses can be involved in providing suitable lifting equipment simultaneously as the cargo vessel lies ready for loading or unloading. In some instances, local lifting equipment can be employed which is mounted on board in special lifting vessels. In other instances, local lifting equipment can be employed which is mounted on or which is carried on special vehicles. In the foremost instances, the cargo vessel is provided with suitable lifting and transportation equipment, and such equipment will complicate the stability of the cargo vessel to a significant degree during the loading and unloading operation.

With the present invention, the aim is to provide a process for loading and unloading of heavy packages, which can be carried out in a controlled, accurately practicable manner by relatively simple means, without problems for the stability of the cargo vessel. In particular, the objective is to be able to handle packages which by virtue of weight and/or design are difficult to handle with a lifting crane of conventional type. More specifically, the aim is to be able to make oneself independent of special lifting vessels and special vehicles and independent of conventional lifting equipment. The aim is to be able to effect lifting of and transportation of heavy packages between cargo vessel and loading und unloading location by means of easily dismountable equipment which is easy to transport from use location to use location and easy to mount at the use location with adaptation as to height to the free board of the cargo vessel in each individual case. The aim is to be able to carry the lifting and transportation equipment with the cargo vessel itself or with arbitrary transportation means, as required.

The process according to the invention is characterised in that a support member, which carries the package, is alternately lifted and lowered relative to a support element by means of a set of lifting means arranged between the support member and the support element and that the support member and the support element, which are provided with their respective climbing arrangements which are supported separately against the foundation, during the relative lifting and lowering movement between support member and support element, alternately activate their respective climbing arrangements for movement of the support member and the support element in a stepwise lifting movement or in a stepwise lowering movement, the support member being transferred in a horizontal direction relative to the support element prior to and after respectively the stepwise lifting and lowering movement is effected.

According to the invention, the support member with associated package can be raised in a controlled manner relative to the lifting component by means of a number of lifting means between the support member and the support element, while the lifting component is supported against the foundation, and thereafter the support element lifted in a controlled manner relative to the support member, while the support member is supported against the foundation. In other words the support member with associated package can be raised by activating the climbing arrangements of the support member, while the support element is effectively supported against the foundation by inactivating its climbing arrangements. Thereafter, by inactivating climbing arrangements of the support member in the raised position of the support member, one can prepare the support member for a new lifting operation by activating climbing arrangements of the support element at the same time as the support element is raised upwards towards the support member via the lifting means. In this way, all relevant lifting movements of the arrangement can be effected by means of the pushing-out movement and the subsequent compression movement of the lifting means. In this way, the vertical raising of the support member and associated package can be effected in stepwise lifting movements in an accurately controlled manner.

Correspondingly lowering of the support member with associated package can be effected by equivalent stepwise lowering movements by alternately activating and inactivating climbing arrangements of the support member and the support element one after the other.

It is preferred that the lifting movement of the climbing arrangements is effected by stepwise filling of fluid material, such as sand, in an associated guide for a support leg for the support member and in an associated guide for a support leg for the lifting component, the lowering movement of the climbing arrangements being effected by stepwise discharging the fluid material from the associated guide for the support leg for the support member and from the associated guide for the support leg for the support element.

By allowing axial displacement of the climbing arrangements to be controlled by support legs and associated guides via a fluid material, such as sand, ready filling and ready emptying of material in the guides can be effected during the lifting movement and during the lowering movement. Furthermore there can be obtained an effective, momentarily acting support for the support legs immediately after filling and an effective lowering of the support legs downwards towards a stable foundation in the guide by the stepwise lowering of the support legs in the assocaited guides.

In connection with the vertical lifting and lowering movement there can be effected, as mentioned, a horizontal transportation movement of the support member to or from the lifting and lowering location prior to and after the lifting and lowering movement. The horizontal transportation movement can generally be effected with suitable transportation means.

According to a preferred solution according to the invention the process is characterised in that after a climbing movement in a direction vertially upwards is effected and the support member is released from its support legs and the lifting means are released from their fastening on the support element and prior to a climbing movement in a direction vertically downwards and prior to a coupling of the lifting means to a fastening on the support element, the lifting means are used for movement of the support member in a horizontal direction relative to the support element by an intermittent pushing and pivotal movement in a first pivotal direction and a pulling and pivotal movement in an opposite second pivotal direction.

In this way one can effect by means of one and the same set of power-exerting means, and by a simple readjustment of different components, in a ready manner and one after the other a) a vertical transportation of the package, and b) a horizontal transportation of the package via the support member on the support element and on adjacent transportation paths. In other words one can according to a preferred solution, effect the vertical transportation as well as the horizontal transportation with one and the same set of power-exerting means, without particular constructional problems.

With the present, invention the aim is an arrangement of the kind mentioned by way of introduction which is especially well suited to carrying out the process as disclosed above.

The arrangement according to the invention is characterised in that it comprises a support member for carrying the package and a support element for supporting the support member in two relative support positions relative to a support element, that is to say in a lower support position resting with support means against the support element and in an upper position supported via lifting means relative to the support element with the support means raised vertically upwards from the support element, that the support element sideways outside the vessel, preferably at each of its four corners, is provided with a vertical climbing arrangement, which is adapted to support alternately the support member and the support element in different height positions relative to each other, that is to say with the support element in a lower and in an upper support position relative to the support member, controlled by the lifting means, and that the support member is adapted to cooperate with the second arrangement with associated transportation means for transportation of the support member in a horizontal direction relative to the support element.

In this way there is obtained firstly an especially simple and easily handleable transportation equipment which is easy to mount and dismount and which is relatively easy and reliable to use.

Furthermore it is possible with the afore-mentioned arrangement to form the basis for an effective combination of a first vertically acting transportation arrangement and a second horizontally acting transportation arrangement. By a simple readjustment of the lower fastening of the lifting means the first transportation arrangement for transportation in a vertical direction can be rearranged, so that it can be employed as the basis for the second transportation arrangement for transportation in a horizontal direction. In this way, one can simplify the transportation equipment by simple means to a significant degree relative to hitherto known solutions.

It is preferred that the support member correspondingly sideways outside the vessel, preferably at each of its four corners, is provided with a second type of vertical climbing arrangement, which rests against the foundation, the first type of climbing arrangements being adapted to raise and lower the support element, while the second type of climbing arrangements are adapted to retain the support member relative to the foundation, and vice versa, controlled by the lifting means on alternately activating the one climbing arrangement and inactivating the second climbing arrangement, and vice versa.

Further features of the invention will be evident from the following description having regard to the accompanying drawings, in which:

FIG. 5 and 6 show in side view the arrangement in a first position during displacement of the support member relative to the support component and in a second position during displacement of the support component relative to the support member.

FIG. 7 shows in horizontal section a section of a column which forms a part of the arrangement as illustrated in FIGS. 1-4.

Figure 1:
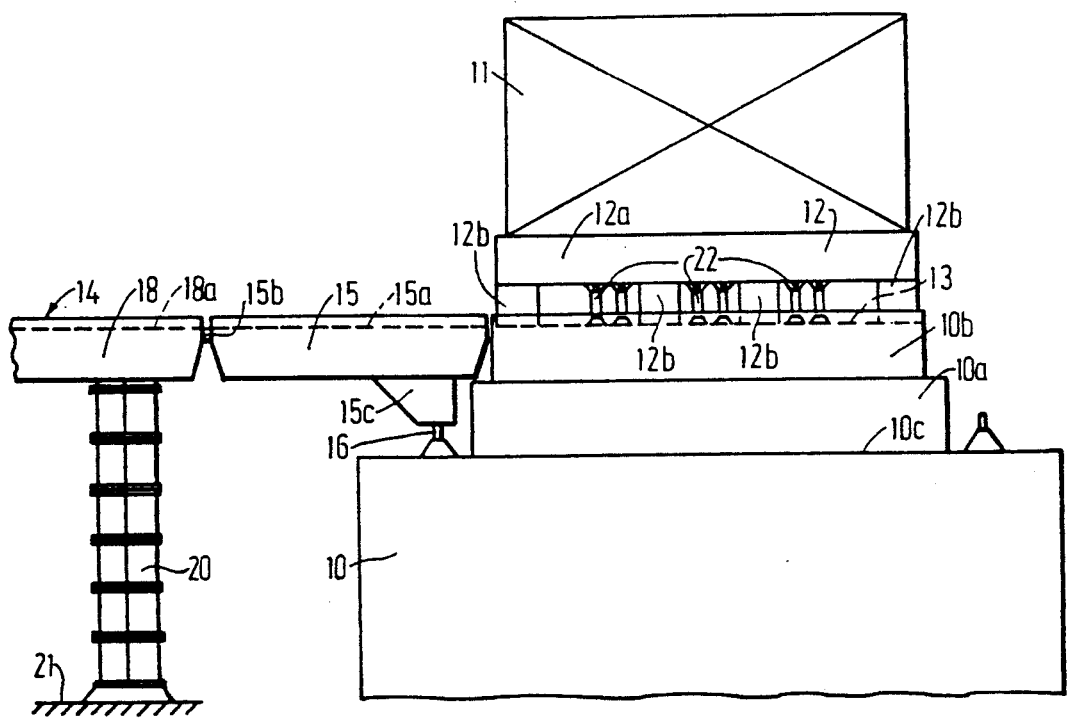
FIG. 1 shows schematically in side view a heavy package arranged on a support member which rests on a stationary guide path on a cargo vessel, made ready for unloading.

In FIG. 1 there is illustrated a cargo vessel 10 which carries a heavy package 11 supported on coamings 10a of the cargo vessel on a hatch member 10b. The package 11 is secured in a manner not shown further to a support member 12. During transportation with the cargo vessel and during transportation of the package 11 to and from the cargo vessel the support member 12 and the package 11 can be rigidly connected to each other to form a coherent unit. During the transfer of the package from the cargo vessel to the quay or similar unloading location on land the package 11 rests on the support member 12 fixedly connected to the latter. The support member 12 is adapted to be displaceable on the cargo vessel along one or more slide paths 13 which are arranged on the hatch member 10b of the vessel 10.

On the land side, there is shown a lifting and lowering arrangement 14 according to the invention which can be set up at an arbitrarily suitable location on land and can be constructed to arbitrary height levels as required and adapted according to the free board of the cargo vessel.

In FIG. 1 the slide path 13 on the cargo vessel is shown horizontally flush with an equivalent slide path 15a on a bridge member 15 which is pivotable about a horizontal axis 15b on one side of the lifting and lowering arrangement 14. The bridge member 15 is provided at its free outer end, on the under side of the bridge member, with a bracket 15c which rests against a rail 16 on the deck 10c of the ship. The bracket 15c is adapted to be displaceable fore and aft and across relative to the rail 16, if the cargo vessel should be moved fore and aft or across relative to the arrangement 14. The bridge member 15 is adapted to be swung about the axis 15b from the position illustrated in FIG. 1 to the position illustrated in FIG. 3.

The lifting and lowering arrangement 14 comprises a support element 18 which is carried by two support columns 19, 20 which are secured below to a foundation 21 on land via base members 19', 20'. Slide path 18a of the support element 18 is shown in FIG. 1 flush with the slide path 15a of the bridge member 15 and with slide path 13 of the vessel.

Figure 3:
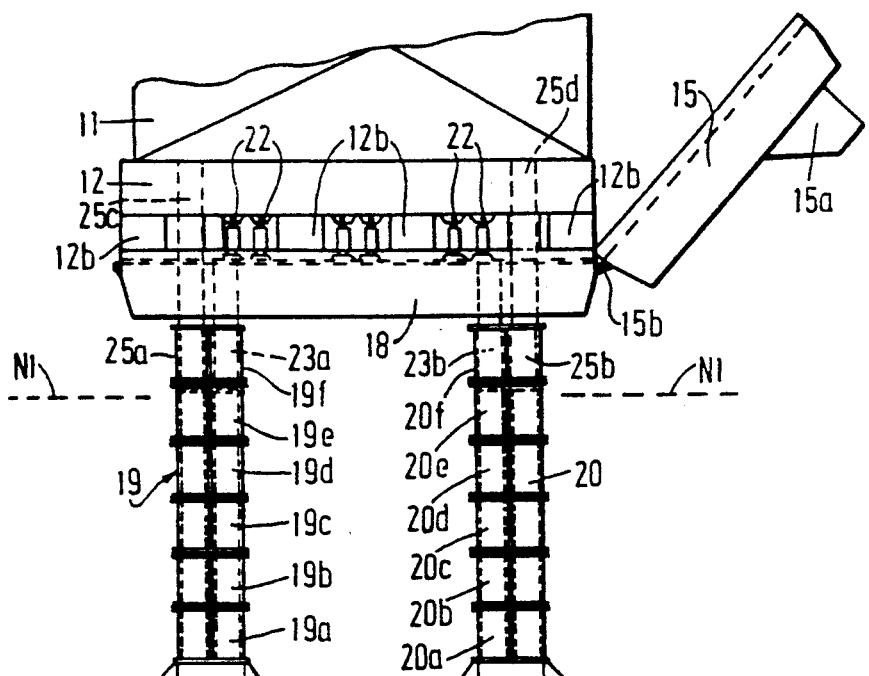
FIG. 3 shows in a corresponding view the support member and package in an outer position on land, that is to say in an end position for the horizontal transportation movement, made ready for lowering towards a foundation on land.
Figure 4:
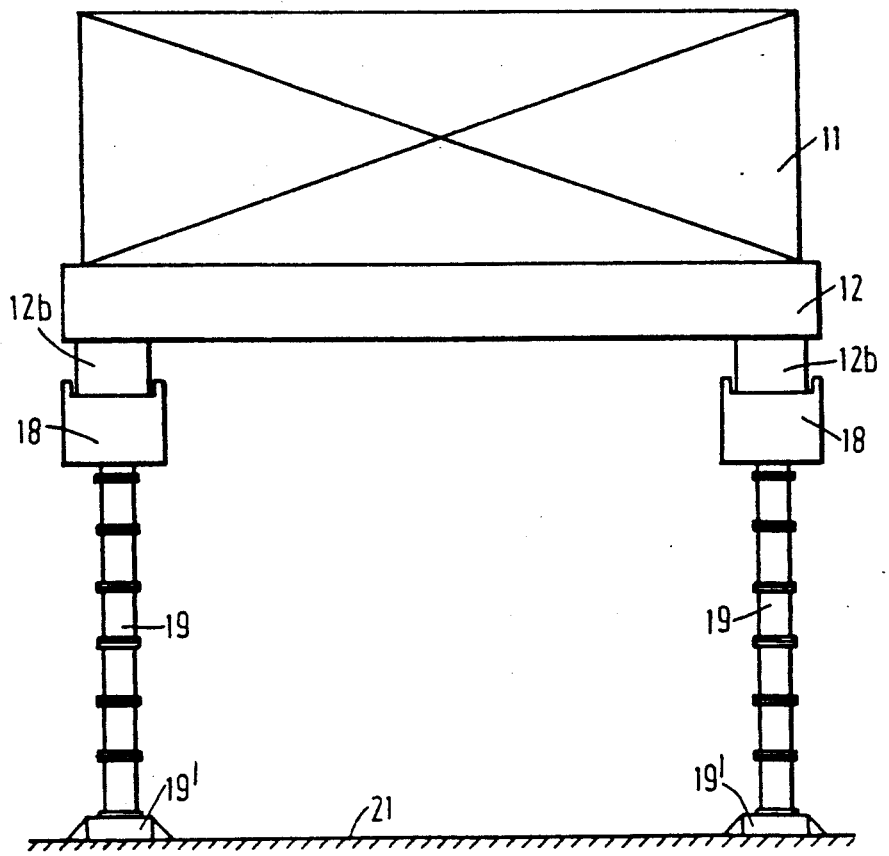
FIG. 4 shows in end view two parallel arrangements as illustrated in FIGS. 1-3.

In FIG. 4 there are shown in end view two parallel lifting and lowering arrangements 14, equivalent to that which is shown in side view in FIG. 3, set up at a suitable mutual distance as required. The support member 12 with associated package 11 is supported at opposite ends in their respective of the two lifting and lowering arrangements 14. If desired instead of the illustrated one pair of lifting and lowering arrangements there can be employed two or more pairs of such lifting and lowering arrangements, where the conditions necessarily demand this.

Figure 2:
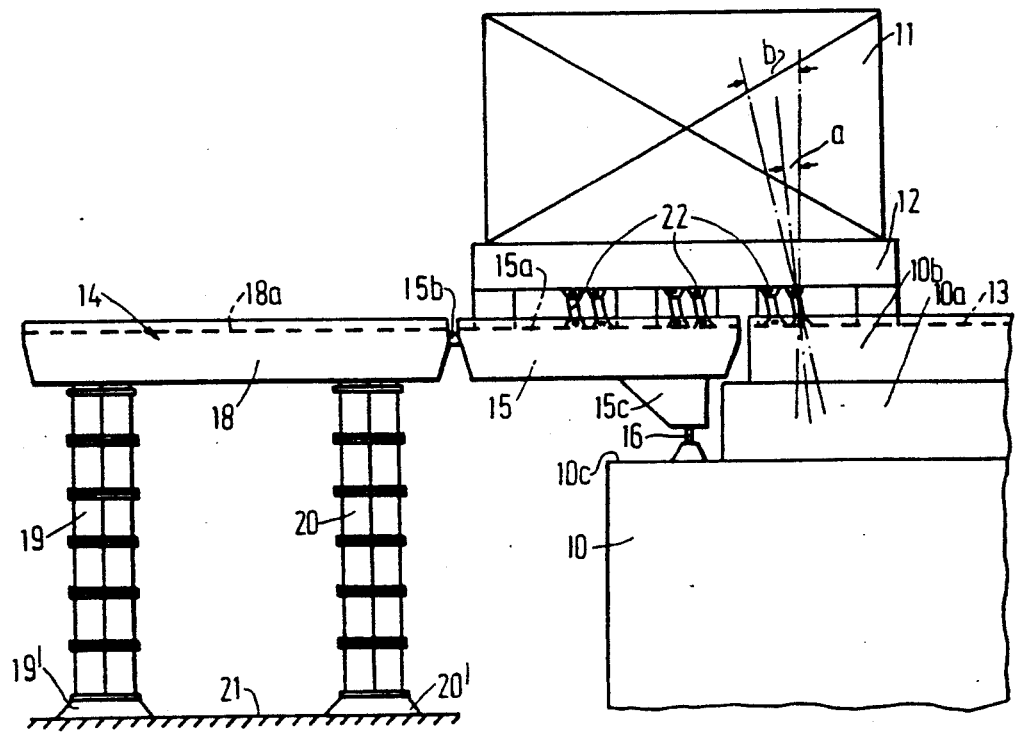
FIG. 2 shows in a corresponding view the support member and package in an intermediate position between the guide path on the cargo vessel and an outer position on land.

The support member 12 is made up of a main frame 12a which on the under side is provided with a row (four shown herein) of support means 12b which rest against the foundation (the slide path 13 in FIG. 1, the slide path 15a in FIG. 2 and the slide path 18a in FIG. 3). In the intermediate spaces between the support means 12b there are arranged groups of lifting means 22 (two lifting means 22 shown herein in each group) between each pair of support means 12b. The lifting means 22 are pivotably mounted above on the under side of the support member 12 in associated brackets 22a (see FIG. 5) and carry below pivotably mounted support shoes 22b which rest against the foundation (the slide path 13 on the hatch member 13, the slide path 15a on a respective bridge member 15 and the slide path 18a on a respective support element 18). In the outer positions as shown in FIG. 1 and 3 the support shoes 22b are intermittently fastened to the foundation.

All sets of lifting means 22 are adapted to be operated synchronously in a common pushing-out movement and a common compression movement. In the starting position in FIG. 1 support shoes 22b of the lifting means 22 can be stationarily attached via locking means not shown further to equivalent fastening points on the slide path 13, so that the support member 12 is locked to the foundation (the hatch member 10b) in the position illustrated. In this way, the lifting means 22 can serve as anchoring means for the support member 12 (and its package 11) during transportation with the cargo vessel. After releasing support shoes 22b of the lifting means 22 from the fastening on the slide path 13, support shoes 22b of the lifting means are freely movable relative to the slide path 13, that is to say made ready for a horizontal transportation of support member 12 with package 11 from the cargo vessel to the lifting and lowering arrangement 14 on land.

In FIG. 2 the support member 12 is shown in an intermediate position between the vessel 10 and the lifting and lowering arrangement 14 which rests against the foundation 21 on land, with partial support for the support member 12 on the slide path 13 and with partial support for the support member 12 on the slide path 15a on the bridge member 15.

The transportation in a horizontal direction along the slide paths 13, 15a (and along the slide path 18a) takes place in that the lifting means 22 are activated and effect a first combined lifting and pivotal movement, from a weak oblique angle a (see FIG. 2) to a greater oblique angle b, by axial extension of the lifting means 22. During this combined lifting and pivotal movement, the support member 12 with associated package 11 are raised obliquely upwards and sideways from a first support installation on the foundation via the support means 12b. The support member falls immediately by its own weight downwardly again towards the foundation to a second support installation via the support means 12b at a certain distance sideways from the first support installation. Thereafter, provision is made, on compressing the lifting means 22, to draw the associated support shoes 22b into place in a new support installation by backwardly pivoting the lifting means from the angle position b to the angle position a, so that the lifting means 22 are ready for a new lifting operation. Corresponding stepwise displacements of the support member 12 with the package 11 are effected from the position illustrated in FIG. 1 via the position illustrated in FIG. 2 to the position illustrated in FIG. 3 by effecting in succession a drawing out and a subsequent compression of the lifting means 22 between established oblique positions as shown by the angles a and b.

After the support member 12 has assumed the position, which is illustrated in FIG. 3, the support shoes 22b are secured to the support element 18 in a respective one of the parallel lifting and lowering arrangements 14 and then so that all the lifting means 22 extend vertically between the support member 12 and the support element 18, while the support member 12 rests on the support element 18. Thereafter, there is effected a swinging of the bridge member 15 from the inactive position illustrated in FIGS. 1 and 2 to that in FIG. 3.

In the position as shown in FIGS. 3 and 5, the support element 18 forms, via first pipe-shaped support leg 23a projecting downwardly from the underside of the support element and a corresponding pipe-shaped second support leg 23b, a support installation in an associated guide 24 in each of the columns 19, 20. After the support member 12 with associated package 11 is led into place in the position which is illustrated in FIG. 3, there are mounted in place a third pipe-shaped support leg 25a and a fourth pipe-shaped support leg 25b through their respective pipe-shaped passages 26 in the support element 18. The support legs 25a, 25b project correspondingly downwards from the under side of the support element 18 to a support installation in an associated guide 27 in each of the columns 19, 20. Each of the columns 19, 20 consequently includes its respective guides 24, 27 for respective support legs 23a, 23b and 25a, 25b. On the top of the support element 18 there are connected by means of a flange joint a first support leg section 25c and a second support leg section 25d with a respective one of the support legs 25a and 25b. In this way, the support member 12 can form a support directly against the foundation 21 on land (in addition to the support of the support element 18 against the foundation) via associated support legs 25a, 25c and 25b, 25d and associated guides 27 in the columns 19, 20, while the support element 18 correspondingly forms a support directly against the foundation 21 on land via the support legs 23a and 23b and associated guides 24. Corresponding support is achieved in both the lifting and lowering arrangements 14 which are shown in FIG. 4.

The guides 24 and 27 extend parallel to each other in the columns 19 and 20. The columns 19, 20 are composed of a series of sections 19a–19f and 20a–20f flanged together endways which each define their portion of the guides 24 and 27. Correspondingly as shown in FIG. 7 each section is composed of two section halves 19a' and 19a" which each define a half of each of the respective guides 24 and 27. In each section there is in connection with each guide 24, 27 a discharge opening 17a and 17b for discharging the medium which is filled in each section.

The guides 24 and 27 are filled in advance with sand or a similar fluid material up to level N1 as shown in FIG. 3. Filling of this material can occur from above via the support legs 23a, 23b and 25a, 25b and longitudinally through each section in the columns 19, 20 or if desired the filling can occur in each section gradually as this is mounted in place in the associated column. The support legs are open above at 28 (see FIG. 5) and provided with an internal passage 29 down to a lower nozzle opening 30 which empties into the middle of a horizontal support surface 31 at the lower end of the support leg. In that the support legs form support installations via the associated annular support surface 31 against the sand or similar material which is filled in the guides 24, 27, there is achieved an effective seal at the nozzle opening 30 via the support surface 31 disposed radially outside.

In the following there will be described with the starting point in the position which is illustrated in FIG. 3 the mode of operation for a transportation arrangement for the vertical transportation of the support member 12 with the package 11, from the raised to lowered position.

From the position which is illustrated in FIG. 3 the support elements 18, the support member 12 and the package 11 are to be transported in a lowering movement vertically downwards towards the foundation 21. Provision is made for an established quantity of sand or similar material to be emptied from the guide 24 at the lower end of an upper section 19f and 20f in each of the columns 19, 20, that is to say by way of discharging an amount which is adapted according to the desired stepwise lowering movement for the support element 18.

In FIG. 5 there is shown such a stepwise emptying of sand from the guide 24 from a level N1 to a level N2 and a corresponding stepwise lowering of support leg 23a of the support element 18 in the guide 24 effected by axial extending of the lifting means 22 as shown in FIG. 5.

In FIG. 6 there is shown an equivalent stepwise emptying of sand from the guide 27 down to the level N2 and an equivalent stepwise lowering of support leg 25a of the support member 12 in the guide 27 on compressing the lifting means 22. A corresponding emptying and lowering cycle is repeated one after the other over a height of the maximum height for a section. Thereafter, the uppermost section is dismounted from the adjacent section, at the same time as dividing up of the dismounted section is effected into two halves. Thereafter, one can immediately continue with a further emptying and lowering operation in a corresponding manner in each of the subsequent sections downwards towards the foundation 21.

In case the package is to be transported in an opposite direction from the foundation 21 vertically upwards towards the position which is shown in FIG. 3, a filling and lifting operation is effected in a reverse sequence to the emptying and lowering operation which is described above. One then starts from a position corresponding to that which is shown in FIG. 6 with sand or similar material filled in the support legs 23a and 25a and effects lifting of the support member 12 with the package 11 in the relation to the support element 18 by extending the lifting means 22. In this way the support leg 25a is raised correspondingly upwards in its guide 27 as is shown in FIG. 5 and the hollow space below the support leg 25a will be filled with material via the nozzle opening 30. After lifting of the support leg 25a is effected and the hollow space below the support leg 25a is filled, the support member 12 is ready for the transfer of the weight to the foundation via the guide 27. Thereafter, by axially compressing the lifting means 22, the support element 18 can be raised upwards with its support leg 23a to an equivalent level as for the support leg 25a (equivalent to the position as shown in FIG. 6), the hollow space which arises below the support leg 23a being gradually filled with material and thereby made ready for a new weight transfer from the support leg 25a to the support leg 23a. Thereafter, a stepwise lifting up can be effected with corresponding alternate lifting and filling operations in the two guides, until sufficient space is defined for installing a subsequent section in the associated column 19 and 20 in each of the two lifting and lowering arrangements 14 as shown in FIG. 4. The lifting and filling operation is continued and the installation of subsequent sections one after the other until the desired level N1 is reached for the fluid material (sand) as shown in FIG. 3.

After the support element 18 with associated support member 12 and package 11 are raised up to the position illustrated in FIG. 3, and when the cargo vessel is brought correspondingly into place, the bridge member 15 can be pivoted into place in a position correspondingly as shown in FIG. 2 and 1 and in an equivalent manner as described above the support member 12 with associated package brought into place in the position which is illustrated in FIG. 1 by equivalent horizontal transportation as described above with reference to FIGS. 1–3.

I claim:

1. An arrangement for lifting and lowering a heavy load comprising
    a support member for receiving a heavy load thereon, said member having a main frame and a plurality of support means depending from said frame to support said frame on a foundation;
    a support element for receiving said support means therein;
    a plurality of lifting means between said support member and said support element, each lifting means being secured to said support member and being movable between a retracted position and an extended position to move said member and said element vertically relative to each other;
    a plurality of pairs of hollow support columns for selectively receiving a flowable medium therein; and
    a plurality of pairs of support legs, one of said support legs of each pair being secured to said support member and slidably received in a respective one of said support columns and the other of said support legs of each pair being secured to said support element and slidably received in a respective another of said support columns.

2. An arrangement as set forth in claim 1 wherein each support leg is hollow and has a horizontal support surface at a lower end for resting on a flowable medium contained in a respective support column and a nozzle opening in said support surface for passage of a flowable medium therethrough into said respective column.

3. An arrangement as set forth in claim 1 wherein said one leg passes through said support element.

4. An arrangement as set forth in claim 1 wherein each support column is formed of a plurality of vertically disposed hollow sections to permit selected removal of a respective section from said column.

5. An arrangement as set forth in claim 4 wherein each section has a discharge opening for discharging flowable medium from said section.

6. An arrangement as set forth in claim 4 wherein each section is formed of two half-sections.

* * * * *